(12) United States Patent
Guarino

(10) Patent No.: US 7,210,366 B2
(45) Date of Patent: May 1, 2007

(54) FULL SUPPORT MAINSHAFT AND FIFTH GEAR DESIGN

(75) Inventor: Daniel Guarino, Roberts, MT (US)

(73) Assignee: 4×4 Tech Incorporated, Roberts, MT (US)

( * ) Notice: Subject to any disclaimer, the term of this patent is extended or adjusted under 35 U.S.C. 154(b) by 265 days.

(21) Appl. No.: 11/007,833

(22) Filed: Dec. 8, 2004

(65) Prior Publication Data

US 2006/0120798 A1   Jun. 8, 2006

(51) Int. Cl.
*F16H 3/08* (2006.01)
*B21D 53/28* (2006.01)

(52) U.S. Cl. ........................... 74/329; 29/893.1
(58) Field of Classification Search .................. 74/325, 74/329, 331, 400, 405, 439, 441, 445; 29/893.1, 29/893.2
See application file for complete search history.

(56) References Cited

U.S. PATENT DOCUMENTS

| | | | |
|---|---|---|---|
| 3,347,110 A * | 10/1967 | Wilson | ........................ 74/397 |
| 3,838,929 A | 10/1974 | Burrell | |
| 4,423,643 A | 1/1984 | McNmara | |
| 4,472,869 A | 9/1984 | Yasui et al. | |
| 4,778,303 A * | 10/1988 | Mullins | ........................ 403/11 |
| 5,154,595 A | 10/1992 | Takeda | |
| 5,333,377 A | 8/1994 | Phillips | |
| 6,196,085 B1 | 3/2001 | Chimonides et al. | |
| 6,581,496 B2 | 6/2003 | Zinsser-Krys et al. | |
| 7,121,259 B2 * | 10/2006 | Wayama et al. | ............. 123/399 |
| 2002/0035883 A1 | 3/2002 | Zinsser-Krys et al. | |
| 2004/0060377 A1* | 4/2004 | Rankin | ........................ 74/329 |

* cited by examiner

*Primary Examiner*—Roger Pang
(74) *Attorney, Agent, or Firm*—Antoinette M. Tease

(57) ABSTRACT

A full support mainshaft and fifth gear design that solves the problem of fifth gear failure on NV4500 transmissions. The first embodiment comprises a sleeve that is installed over the smooth support surface of a factory mainshaft. The second embodiment is a mainshaft comprising a support shoulder, splined area, and threaded area. The sleeve of the first embodiment and support shoulder of the second embodiment are slightly greater in diameter than the splined area on the mainshaft. The inside of the gear of the present invention has both a smooth bore area and a splined area. The gear is press fit onto the mainshaft, and in the first embodiment, a spring washer, flat nut and clamp-style nut are installed on the mainshaft after the gear. In the second embodiment, a spring washer, first flat nut, tanged washer, second flat nut and lipped nut are used.

3 Claims, 6 Drawing Sheets

PRIOR ART

PRIOR ART

PRIOR ART

PRIOR ART

FULL SUPPORT MAINSHAFT AND FIFTH GEAR DESIGN

BACKGROUND OF THE INVENTION

1. Field of the Invention

The present invention relates to the field of automotive transmissions, and more particularly, to a full support mainshaft and fifth gear design for the New Venture/MTM NV4500 transmissions.

2. Description of the Related Art

"Losing" fifth gear is a common complaint with the NV4500 transmissions, particularly when they are coupled to a diesel engine. Although the nut is often blamed, it is actually the mainshaft that fails. The problem is caused by inadequate support of the gear on the mainshaft.

The factory gear is fully splined on its inner surface. On the outside of the gear, approximately half the gear is covered with gear teeth. In the area below the gear teeth, only the tips of the inner gear splines are in contact with the smooth support area of the mainshaft. Thus, the gear is not adequately supported by the mainshaft, and the tips of the splines actually wear into the smooth support area of the mainshaft until the gear is no longer a press fit to the shaft. Once the gear is loose, it either works the mainshaft nut loose until it spins off, which allows the gear to move backward and out of alignment with the mating countershaft gear, or the gear spins on the shaft even though the nut stays on. In either case, the ability to use fifth gear is lost. Installing a new fifth gear and/or nut on a worn mainshaft is only a short-term repair, and the imbalance caused by the wobbling gear often results in transfer case damage. Welding the gear onto a worn mainshaft does not work, nor does LOCTITE®, a high-performance adhesive manufactured by Henkel Technologies. Fifth gear is no longer available until the transmission is repaired.

Both the original equipment manufacturer and the aftermarket have introduced various nut designs in an effort to remedy this problem and keep the gear on the shaft. Aftermarket manufacturers have also tried to correct this problem with two variations of mainshafts that have full-length splines for the fifth gear. The first variation of the aftermarket mainshaft was designed for a fairly light press fit between the gear and shaft. It also uses a spring washer and flat nut to hold the gear onto the shaft. The second variation of the aftermarket mainshaft uses a slip fit between the gear and shaft plus a three-piece thrust washer (consisting of a split washer and a retaining ring) between the mainshaft lock washer (a spring washer) and fifth gear. None of these "fixes" has been successful in preventing fifth gear failures.

FIGS. 1–14 illustrate the prior art. FIG. 1 is a perspective view of a new factory mainshaft 1 without the gear. This figure shows the splines 2, smooth support area 3, and threaded area 4 of the mainshaft. The gear fits over the splines 2 and the smooth support area 3.

FIG. 2 is a partial perspective view of a factory mainshaft 1 with the factory gear 5, spring washer 6 and flat nut 7. The washer 6 and nut 7 fit over the threaded area 4 of the shaft. In an early attempt to solve the problem of the gear working itself off of the shaft, the spring washer 6 was added between the gear 5 and the nut 7. The addition of the washer, however, did not solve the problem.

FIG. 3 is an exploded perspective view of the factory gear 5, spring washer 6 and flat nut 7 of FIG. 2. The nut 7 comprises notches 7a that allow the nut to be turned with a wrench. In the prior art, the nut typically has a beveled edge (not shown) facing the spring washer. The beveled edge has no functional purpose.

FIG. 4 is a perspective view of the factory gear 5 showing the full inner splines 8. As shown in this figure, the splines are triangular in shape with blunt (as opposed to pointed) tips.

FIG. 5 is a partial perspective view of a used factory mainshaft 1 showing the area where the gear 5 (not shown) wears into the shaft. As shown in this figure, the smooth support area 3 is no longer smooth but actually has subtle indentations that have been worn into it by the gear splines 8 (see FIG. 4). These indentations cause the gear to work loose. Once the gear is loose, it works the nut and washer loose, which leads to fifth gear failure. Note that the diameter of the support surface 3 on the factory mainshaft 1 is smaller in diameter than the splined area 2. That difference in diameter is a key factor in the problem addressed by the present invention.

FIG. 6 is a perspective view of the first aftermarket mainshaft variation without the gear. This variation is a press fit aftermarket shaft 9. As shown in this figure, there is no smooth support surface 3 (see FIGS. 1 and 5). Instead, the splined area 10 has been extended so that the entire area below the gear is splined. The shaft still contains a threaded area 4, which further comprises a keyslot 11. The purpose of the keyslot 11 is illustrated in FIGS. 7 and 8.

FIG. 7 is a partial perspective view of the aftermarket mainshaft 9 shown in FIG. 6 with the factory gear 5, spring washer 6 and lipped nut 12. The washer 6 and nut 12 fit over the threaded area 4 of the shaft. The lipped nut 12 represents another attempt to solve the problem of the gear working loose. With this type of nut, part of the lip 12a is bent and pressed down into the keyslot 11. The thought was that the lip 12a in the keyslot 11 would prevent the nut 12 from coming loose, even if the gear 5 came loose. This nut design did not work either. FIG. 8 is an exploded perspective view of the factory gear 5, spring washer 6, and lipped nut 12.

FIG. 9 is a perspective view of the second aftermarket mainshaft variation without the gear. This variation is a slip fit aftermarket mainshaft 13 showing a groove 14 for a split washer (shown in FIG. 10). The groove is located between the splined area 10 and the threaded area 4. As with the press fit aftermarket shaft, the splined area 10 is extended so that the entire area below the gear is splined, and the threaded area 4 includes a keyslot 11.

FIG. 10 is a partial perspective view of the slip fit aftermarket mainshaft 13 shown in FIG. 9 with the gear 5, split washer (not shown) and retaining ring 15, spring washer 6, and lipped nut 12. the split washer and retaining ring fit within the groove 14 shown in FIG. 9. The spring washer 6 and nut 12 fit over the threaded area 4 of the shaft. As in FIG. 7, the lip 12a of the nut is pressed down into the keyslot. Because the configuration shown in FIG. 7 was not effective in keeping the gear on the shaft, the split washer (not shown) and retaining ring 15 were added. FIG. 11 is an exploded perspective view of the gear 5, split washer 16 and retaining ring 15, spring washer 6, and lipped nut 12.

None of the designs described above was successful in preventing fifth gear failure, and alternate nut designs were developed with the hope that they would serve to keep the gear on the shaft. FIG. 12 is a perspective view of a clamp-style nut 17. This nut has horizontal screws or clamps 18 that were intended to hold the nut more tightly on the threaded area 4 of the mainshaft. FIG. 13 is a perspective view of a nut with set screws 13. This nut comprises vertical screws 20 that are screwed down against the threads of the threaded area 4 on the mainshaft. Like the other designs described above, neither of these nut designs was effective in solving the problem.

With both the factory shaft and the aftermarket shaft, the gear is not fully supported by the area underneath it on the shaft. With the factory shaft, the smooth support area is smaller in diameter than the splined area so that only the tips of the inner gear splines are in contact with the smooth support area. With the aftermarket shaft, although the area beneath the gear is fully splined, the inner splines of the gear are not fully congruent with the splines on the shaft. This point is illustrated in FIG. 14, which is a partial section view of the gear 5 on an aftermarket mainshaft. The splined area of the mainshaft 10 is shown in relation to the inner gear splines 8. As shown in this figure, there are gaps between the inner gear splines 8 and the splines 10 on the mainshaft. These gaps lead to instability of the gear on the shaft and, ultimately, the loosening of the gear on the shaft.

It is an object of the present invention to solve the problem described above by providing a mainshaft and fifth gear design that affords more adequate support for the gear on the shaft and that does not result in fifth gear failure. It is a further object of the present invention to provide an embodiment that constitutes a retrofit of an existing factory mainshaft and an embodiment that is an entirely new mainshaft design.

BRIEF SUMMARY OF THE INVENTION

The present invention covers two different embodiments of a mainshaft and fifth gear design that solve the problem of fifth gear failure on NV4500 transmissions. The first embodiment is a retrofit of a factory mainshaft, and it comprises a sleeve that is installed over the smooth support surface of the mainshaft. In the preferred embodiment, the sleeve has a tapered edge that is adjacent to the splined area on the mainshaft and that facilitate installation of the gear on the mainshaft. The outside diameter of the sleeve is preferably 0.01 to 0.30 inches greater than the outside diameter of the splines on the mainshaft.

The second embodiment is a new mainshaft design that comprises a support shoulder, a splined area, and a threaded area. In the preferred embodiment, the length of the splined area is greater than it is on the factory mainshaft, and the outside diameter of the support shoulder is 0.01 to 0.30 inches greater than the outside diameter of the splines on the mainshaft. The threaded area comprises a keyslot that is preferably longer than the keyslot on aftermarket mainshafts.

Both embodiments include an improved fifth gear with a smooth bore area and a splined area on the inside of the gear. Unlike factory gears, the splined area does not extend the entire length of the gear. In one embodiment, the rear face of the gear is machined down to decrease its width to accommodate the nut configuration.

When the improved fifth gear is installed on the first embodiment of the mainshaft (the retrofit version), a spring washer, flat nut and clamp-style nut are placed (in the case of the washer) or threaded (in the case of the nuts) onto the threaded area of the mainshaft. When the improved fifth gear is installed on the second embodiment of the mainshaft (the new version), a spring washer, a first flat nut, a tanged washer, a second flat nut, and a lipped nut are placed (in the case of the washers) or threaded (in the case of the nuts) onto the threaded area of the mainshaft. The outer nuts are preferably thinner than the inner and middle nuts, and the tang on the tanged washer fits into a keyslot on the threaded area of the mainshaft.

| REFERENCE NUMBERS | |
|---|---|
| 1 | Factory mainshaft |
| 2 | Splines on factory mainshaft |
| 3 | Smooth support surface |
| 4 | Threaded area |
| 5 | Factory gear |
| 6 | Spring washer |
| 7 | Flat nut |
| 7a | Notches (in nut) |
| 8 | Inner gear splines (factory gear) |
| 9 | Aftermarket mainshaft (press fit) |
| 10 | Splines on aftermarket mainshaft |
| 11 | Keyslot (for lip of nut) |
| 12 | Lipped nut |
| 12a | Lip of nut |
| 13 | Aftermarket mainshaft (slip fit) |
| 14 | Groove (for split washer and retaining ring) |
| 15 | Retaining ring |
| 16 | Split washer |
| 17 | Clamp-style nut |
| 18 | Clamps |
| 19 | Nut with set screws |
| 20 | Set screws |
| 21 | Sleeve |
| 21a | Tapered edge |
| 22 | Gear of present invention (first embodiment) |
| 23 | Inner gear splines (present invention) |
| 24 | Smooth bore area of gear (present invention) |
| 25 | Mainshaft of present invention |
| 26 | Splines on mainshaft of present invention |
| 27 | Support shoulder |
| 28 | Keyslot (for tanged washer) |
| 29 | Gear of present invention (second embodiment) |
| 30 | Rear face of gear |
| 31 | Drive teeth |
| 32 | Tanged washer |

DETAILED DESCRIPTION OF INVENTION present invention solves the problem of fifth gear failure on NV4500 transmissions by (i) providing a smooth sleeve or shoulder with a diameter that is larger side diameter of the splines on the mainshaft and (ii) by modifying the gear so that it has a smooth, unsplined bore that will press onto the mainshaft sleeve or shoulder. In addition, the gear is retained by multiple nuts and, in one embodiment, a tanged washer, rather than a single nut and spring washer. Unlike any of the prior art designs, the design of the present invention maintains the gear in rigid alignment and concentric with the shaft.

The reason the present invention works is because the modified gear is fully supported at all times by the mainshaft sleeve or shoulder onto which it is pressed. The smooth bore on the inside of the gear is in full contact with the sleeve or shoulder, with no voids or sharp splines that can wear into the smooth part of the shaft. This part of the gear is on the same end of the gear as the drive teeth, which constitute the load-bearing portion of the gear. With this design, the actual surface area of the gear that is in full contact with the shaft is much greater than in existing designs. Furthermore, by providing greater thread contact and inherent resistance to backing off, the multiple nuts and tanged washer ensure that even a loose gear will not work loose.

Figure 1:
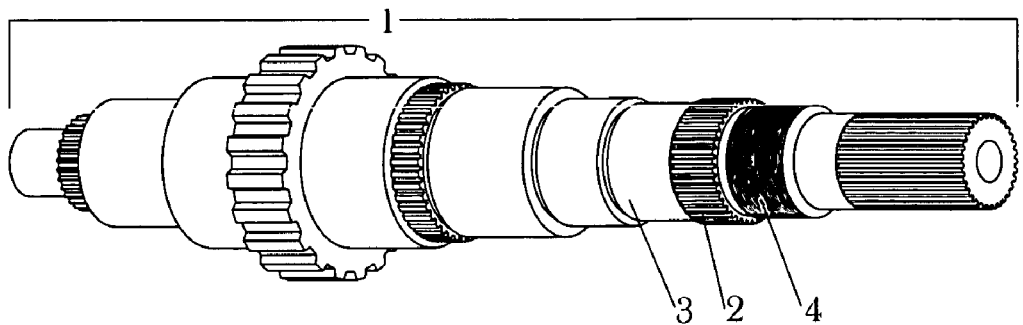
FIG. 1 is a perspective view of a new factory mainshaft without the gear.

FIGS. 15–22 depict the mainshaft and fifth gear design of the present invention. The first embodiment is a retrofit of a factory mainshaft. In this embodiment, shown in FIG. 15, a sleeve 21 is installed over the smooth support surface 3 (see FIG. 1) of a factory mainshaft 1. The sleeve is preferably made of steel, although it can be made of any other metal or material that provides the requisite durability. The sleeve has a tapered edge 21a to facilitate installation of the gear over the sleeve 21. The outside diameter of the sleeve is slightly greater than the outside diameter of the splines 2. In the preferred embodiment, the outside diameter of the sleeve is 0.01 to 0.30 inches greater than the outside diameter of the splines on the mainshaft. The outside diameter of the rear end of the sleeve (i.e., the end with the sleeve adjacent to the splined area 2 but before the tapered edge 21a) is preferably 0.001 to 0.003 inches less than the outside diameter of the front end of the sleeve. The purpose of this slight difference in diameter is to allow the gear splines (shown in FIG. 16) to engage with the shaft splines 2 before the press fit begins. The threaded area 4 is the same as on a standard factory mainshaft.

Figure 15:
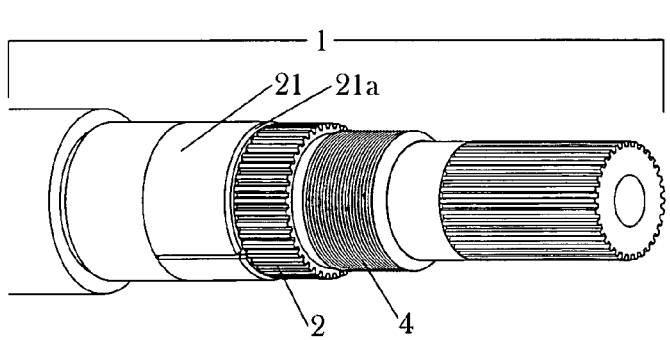
FIG. 15 is a partial perspective view of a first embodiment of the mainshaft of the present invention, in which a sleeve is added to a factory mainshaft.
Figure 16:
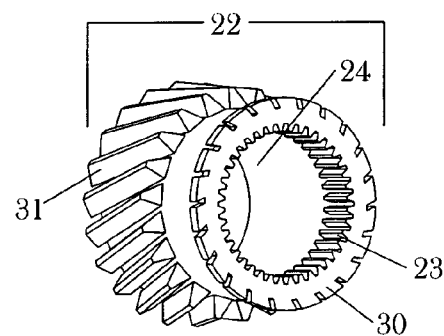
FIG. 16 is a perspective view of a first embodiment of the gear of the present invention, in which approximately half of the inner splines of the gear are removed.

FIG. 16 shows a first embodiment of the fifth gear design of the present invention. In this embodiment, the inside of the gear 22 comprises a splined area 23 and a smooth bore area 24. The smooth bore area corresponds to the sleeve 21 of FIG. 15, and the splined area 23 corresponds to the splines 2 of FIG. 15. The inside diameter of the gear is preferably 0.001 to 0.003 smaller than the outside diameter of the sleeve 21 to provide a press fit. In addition, the rear face 30 of the gear is preferably machined down (made thinner) to accommodate the nut configuration shown in FIG. 17.

Figure 2:
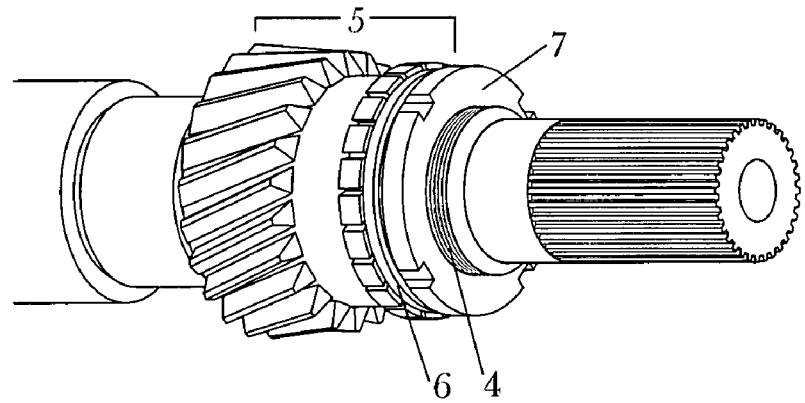
FIG. 2 is a partial perspective view of a factory mainshaft with the factory gear, spring washer and flat nut.
Figure 3:
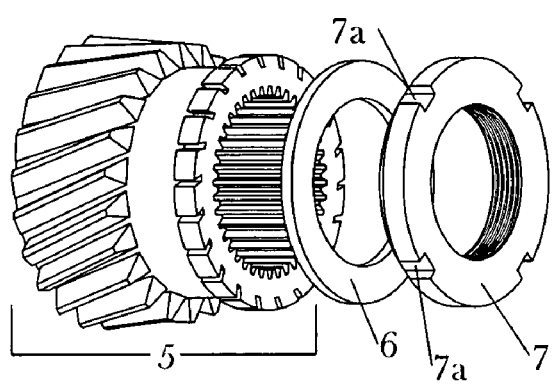
FIG. 3 is an exploded perspective view of the factory gear, spring washer and flat nut of FIG. 2.
Figure 4:
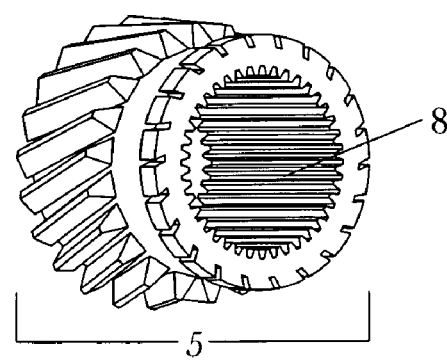
FIG. 4 is a perspective view of the factory gear showing the full inner splines.
Figure 5:
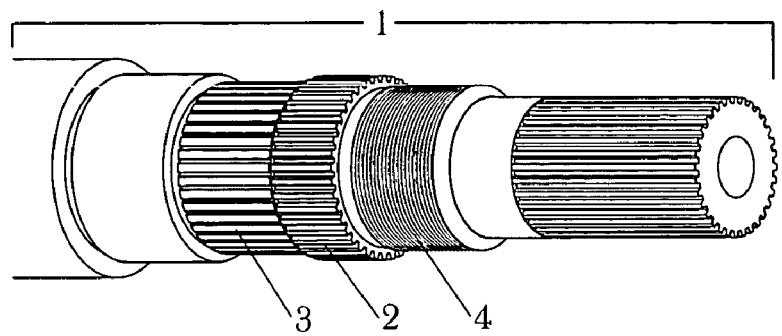
FIG. 5 is a partial perspective view of a used factory mainshaft showing the area where the gear wears into the shaft.
Figure 17:
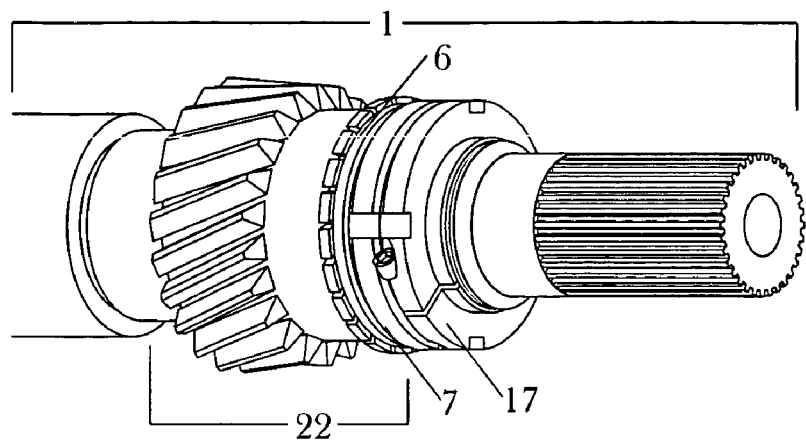
FIG. 17 is a partial perspective view of the mainshaft of FIG. 15 with the gear, spring washer, flat nut, and clamp-style nut.
Figure 18:
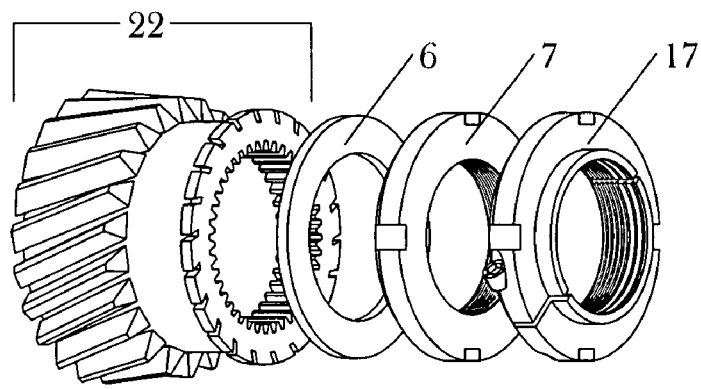
FIG. 18 is an exploded perspective view of the gear of FIG. 16, spring washer, flat nut, and clamp-style nut.

FIG. 17 is a partial perspective view of the mainshaft of FIG. 15 with the gear 22, spring washer 6, flat nut 7 and clamp-style nut 17. The gear is now fully supported because the sleeve 21 adds diameter to the smooth support surface 3, and the inside of the gear is smooth (rather than splined) over the sleeve. There is still some spline-to-spline contact between the gear and the mainshaft, but it is not the main or sole basis for contact between the gear and the mainshaft, as in the factory and aftermarket designs, respectively. In contrast to the configuration shown in FIG. 2, a clamp-style nut 17 is added after the flat nut 7 to provide additional stability. The clamp-style nut 17 is preferably thinner than the flat nut 7. FIG. 18 is an exploded perspective view of the gear of FIG. 16, spring washer, flat nut and clamp-style nut.

Figure 6:
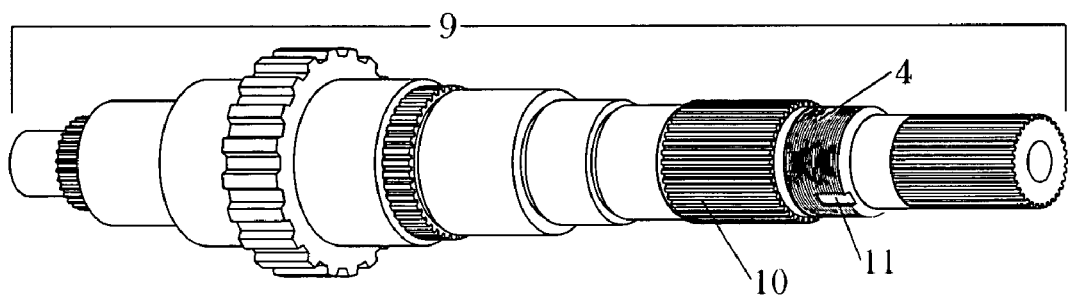
FIG. 6 is a perspective view of a press fit aftermarket mainshaft without the gear.
Figure 7:
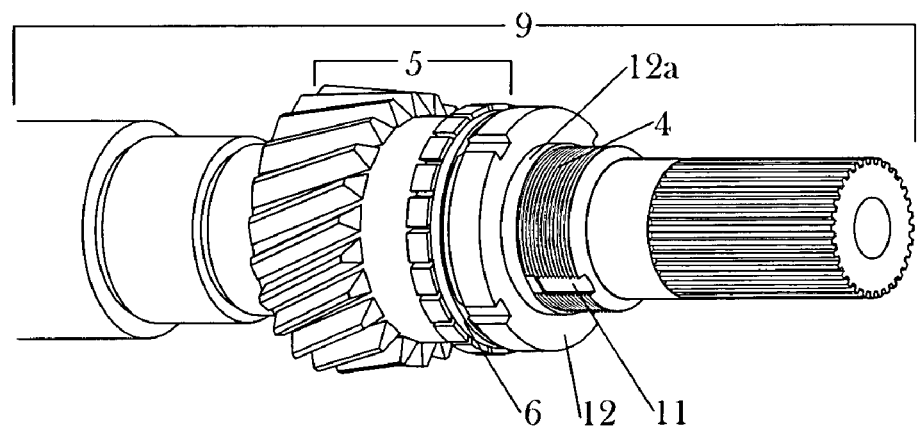
FIG. 7 is a partial perspective view of a press fit aftermarket mainshaft with the factory gear, spring washer and lipped nut.
Figure 8:
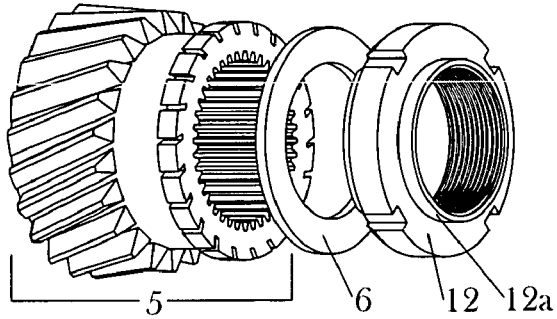
FIG. 8 is an exploded perspective view of the factory gear, spring washer, and lipped nut.
Figure 9:
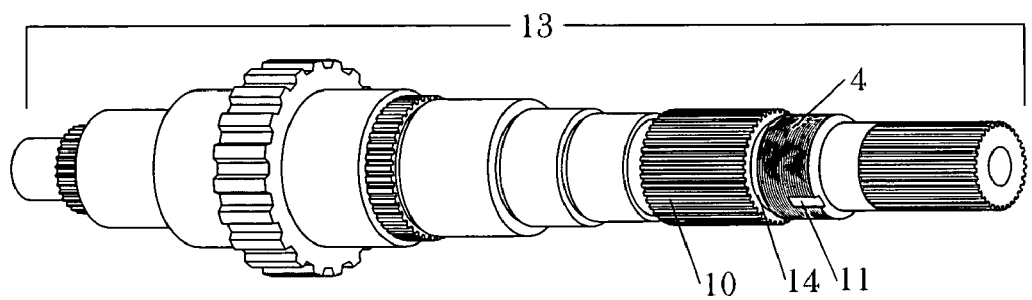
FIG. 9 is a perspective view of a slip fit aftermarket mainshaft without the gear showing the groove for the split washer.
Figure 10:
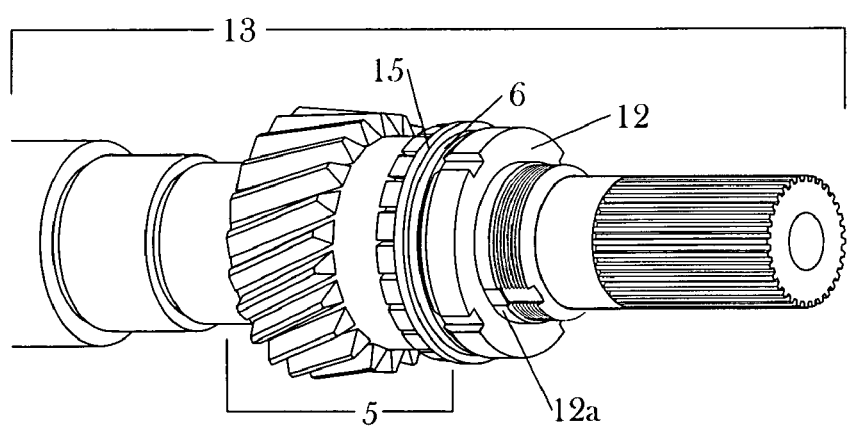
FIG. 10 is a partial perspective view of the slip fit aftermarket mainshaft with the gear, split washer and retaining ring, spring washer, and lipped nut.
Figure 11:
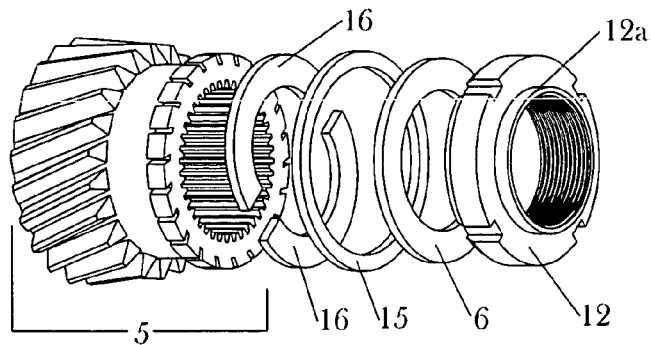
FIG. 11 is an exploded perspective view of the gear, split washer and retaining ring, spring washer, and lipped nut.
Figure 12:
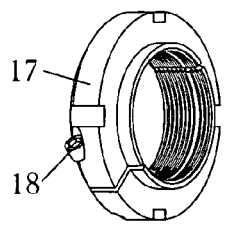
FIG. 12 is a perspective view of a clamp-style nut.
Figure 13:
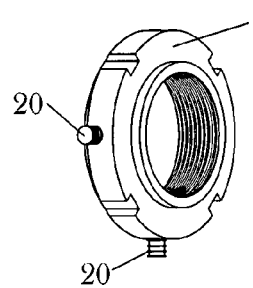
FIG. 13 is a perspective view of a nut with set screws.
Figure 14:
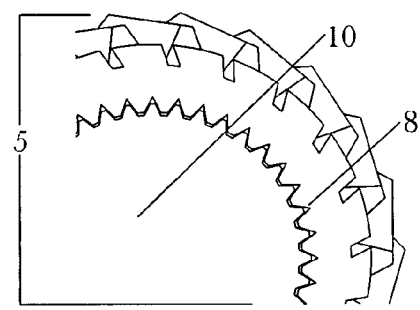
FIG. 14 is a partial section view of the gear on an aftermarket mainshaft showing the non-alignment of the splines on the inside of the gear with the splines on the outside of the mainshaft.

The second embodiment of the present invention is an entirely new mainshaft (not a retrofit). In this embodiment, shown in FIG. 19, the mainshaft comprises a lengthened splined area 26 and a support shoulder 27. In the preferred embodiment, the splined area 26 is approximately 0.5 inches longer than the splined area on a factory mainshaft (see FIG. 1). The threaded area 4 comprises a keyslot 28 that is longer than the keyslot 11 shown in FIGS. 6 and 9. Like the sleeve of the previous embodiment, the diameter of the support shoulder 27 is slightly greater than the diameter of the splined area 26. This increased diameter provides for a tighter fit between the gear and the mainshaft. In the preferred embodiment, the outside diameter of the support shoulder is 0.01 to 0.30 inches greater than the outside diameter of the splines on the mainshaft. The support shoulder 27 does not have a tapered edge (as does the sleeve shown in FIG. 15) because the lengthened splines 26 make it easier to install the gear on the support shoulder 27.

Figure 20:
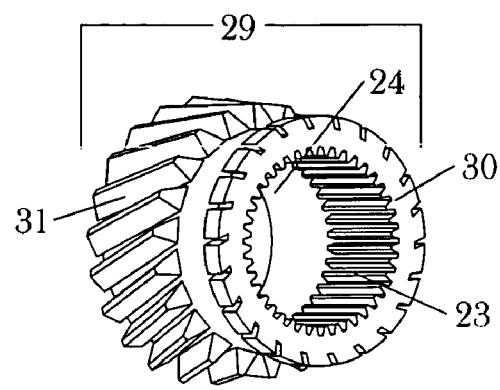
FIG. 20 is a perspective view of a second embodiment of the gear of the present invention, in which approximately half of the inner splines of the gear are removed and the end of the gear opposite the gear teeth is reduced in width.

FIG. 20 shows a second embodiment of the fifth gear design of the present invention. In this embodiment, the inside of the gear 29 comprises a splined area 23 and a smooth bore area 24. The splined area 23 corresponds to the splines 26 on the mainshaft, and the smooth bore area 24 partially covers the support shoulder 27 when the gear is installed on the mainshaft. The splined area 23 is longer in this embodiment than in the retrofit design (shown in FIG. 16) because the splines on the new mainshaft 25 are longer than the splines on the factory shaft 1. The rear face 30 of the gear may be machined down (as shown in FIG. 16) to allow for the nut configuration shown in FIG. 21, but in most cases this will not be necessary due to the longer threaded area on the shaft. The inside diameter of the gear is preferably 0.001 to 0.003 smaller than the outside diameter of the support shoulder 27 to provide a press fit.

Figure 19:
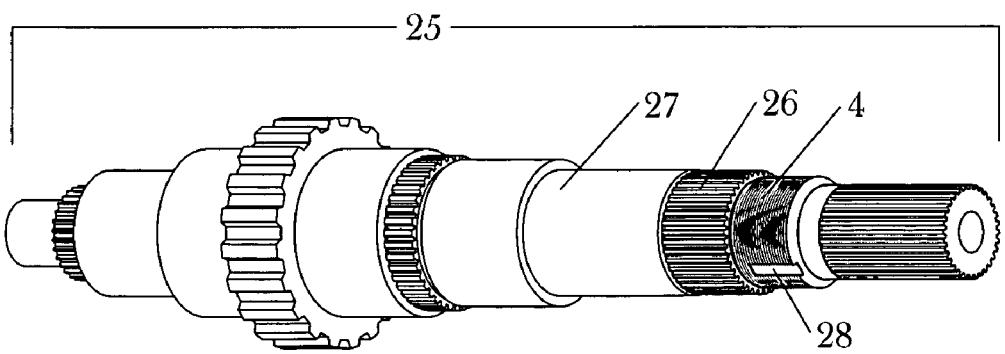
FIG. 19 is a perspective view of a second embodiment of the mainshaft of the present invention, in which the mainshaft comprises a support shoulder.
Figure 21:
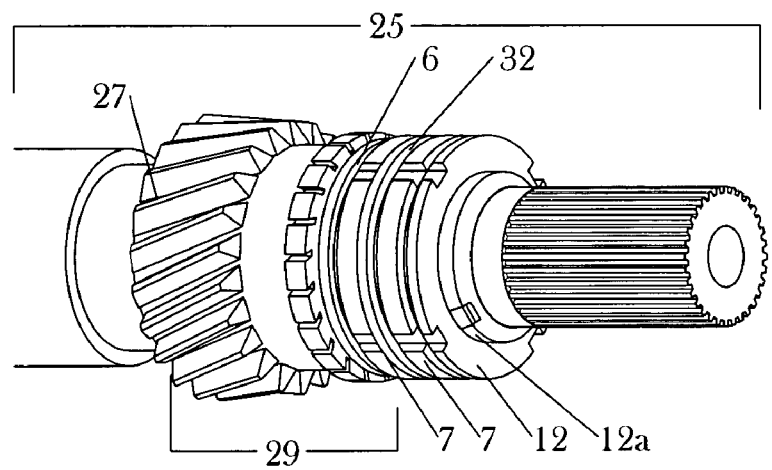
FIG. 21 is a partial perspective view of a second embodiment of the mainshaft of the present invention with the gear, spring washer, single flat nut, tanged lock washer, and double flat nuts.
Figure 22:
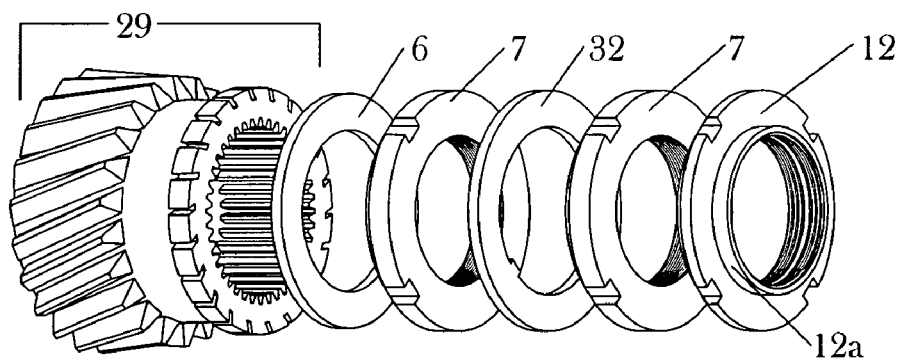
FIG. 22 is an exploded perspective view of the mainshaft of FIG. 19 with the gear, spring washer, single flat nut, tanged lock washer, and double flat nuts.

FIG. 21 is a partial perspective view of the mainshaft of FIG. 19 with the gear installed on it. This embodiment includes a unique nut and washer configuration, namely, a spring washer 6, single flat nut 7, tanged lock washer 32, flat nut 7 and lipped nut 12. The tanged lock washer 32 has a tang that fits into the keyslot 28 shown in FIG. 19. The lip 12a of the lipped nut 12 also fits into the keyslot 28. The spring washer 6, flat nut 7, tanged lock washer 32, flat nut 7 and lipped nut 12 all fit within the threaded area 4 of the shaft. For that reason, the width of the gear 29 may be decreased as described in connection with FIG. 20, and the lipped nut 12 is preferably thinner than the flat nut 7. FIG. 22 is an exploded perspective view of the mainshaft of FIG. 19 with the gear 29, spring washer 6, first flat nut 7, tanged lock washer 32, second flat nut 7 and lipped nut 12.

Although several preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A fifth gear mainshaft for use with a New Venture/ MTM NV4500 transmission, comprising:
   (a) a support shoulder;
   (b) a splined area; and
   (c) a threaded area,
   wherein the support shoulder is directly adjacent to the splined area, wherein the support shoulder and splined are lie directly underneath a fifth gear when it is installed on the mainshaft, wherein the length of the splined area is approximately 0.5 inches longer than it is on a factory fifth gear mainshaft for the New Venture/ MTM NV4500 transmission, and wherein the outside diameter of the support shoulder is 0.01 to 0.30 inches greater than the outside diameter of the splined area to provide for a tighter fit between the gear and the mainshaft.

2. A mainshaft and fifth gear design for use with a New Venture/MTM NV4500 transmission, comprising:
   (a) the fifth gear mainshaft of claim 1;
   (b) an improvement of a fifth gear for use in connection with a New Venture/MTM NV4500 transmission, the improvement comprising a smooth bore area on the inside of the gear;
   (c) a spring washer;
   (d) a first flat nut;
   (e) a tanged washer;
   (f) a second flat nut; and
   (g) a lipped nut,
   wherein the mainshaft comprises a threaded area, and wherein the spring washer, first flat nut, tanged washer, second flat nut and lipped nut fit on the threaded area of the mainshaft.

3. A mainshaft and fifth gear design for use with a New Venture/MTM NV4500 transmission, comprising:
   (a) the mainshaft of claim 1, wherein the threaded area comprises a keyslot;
   (b) an improvement of a fifth gear for use in connection with a New Venture/MTM NV4500 transmission, the improvement comprising a smooth bore area on the inside of the gear;
   (c) a spring washer;
   (d) a first flat nut;
   (e) a tanged washer;
   (f) a second flat nut; and
   (g) a lipped nut,
   wherein the tanged washer comprises a tang, wherein the lipped nut comprises a lip, and wherein the tang and lip both fit into the keyslot on the mainshaft.

* * * * *